United States Patent
Distler et al.

(10) Patent No.: US 8,139,572 B1
(45) Date of Patent: Mar. 20, 2012

(54) METHOD FOR BI-DIRECTIONAL SYMMETRIC ROUTING IN MULTI-HOMED NETWORKS WITH STATEFUL FIREWALLS

(75) Inventors: Rudi Distler, Holmdel, NJ (US); Mark N. Evans, Hillsborough, NJ (US); Thusitha Jayawardena, Holmdel, NJ (US)

(73) Assignee: AT & T Intellectual Property II, LP, Atlanta, GA (US)

( * ) Notice: Subject to any disclaimer, the term of this patent is extended or adjusted under 35 U.S.C. 154(b) by 989 days.

(21) Appl. No.: 11/207,973

(22) Filed: Aug. 19, 2005

(51) Int. Cl.
*H04L 12/28* (2006.01)

(52) U.S. Cl. .......................... 370/389; 370/427

(58) Field of Classification Search .................. 370/389, 370/427, 465, 401
See application file for complete search history.

(56) References Cited

U.S. PATENT DOCUMENTS

| | | | |
|---|---|---|---|
| 6,694,429 B1 | 2/2004 | Kalmanek, Jr. et al. | |
| 6,779,039 B1 | 8/2004 | Bommareddy et al. | |
| 6,829,239 B1 | 12/2004 | Bhatia et al. | |
| 6,888,837 B1 | 5/2005 | Cunningham et al. | |
| 6,915,421 B1 | 7/2005 | Kalmanek Jr. et al. | |
| 6,928,082 B2 | 8/2005 | Liu et al. | |
| 7,307,990 B2 * | 12/2007 | Rosen et al. | 370/392 |
| 2004/0190549 A1 * | 9/2004 | Huitema | 370/466 |
| 2005/0229246 A1 * | 10/2005 | Rajagopal et al. | 726/14 |
| 2006/0050708 A1 * | 3/2006 | Shapiro et al. | 370/394 |
| 2006/0098663 A1 * | 5/2006 | Shore | 370/401 |

* cited by examiner

*Primary Examiner* — Dang Ton
*Assistant Examiner* — Wei Zhao
(74) *Attorney, Agent, or Firm* — Fay Kaplun & Marcin, LLP (57) ABSTRACT

There are provided systems and methods for symmetric bi-directional routing in multi-homed IP networks which includes sending an IP packet having a source address from a first host and substituting the source address with an exterior routing address by a first network address translation gateway or firewall of the first host using conditional substitution. The IP packet, with the exterior routing address, is optionally routed via intermediate networks and firewalls and received by a first gateway or firewall of a second host. The second host responds to the first host along a route which traverses the same set of firewall gateways as the initial IP packet by using the exterior routing address as a destination address. The exterior routing address is converted back to the source address by the first network address translation gateway of the first host.

11 Claims, 7 Drawing Sheets

METHOD FOR BI-DIRECTIONAL SYMMETRIC ROUTING IN MULTI-HOMED NETWORKS WITH STATEFUL FIREWALLS

BACKGROUND INFORMATION

Across both the global internet and enterprise networks achieving routing symmetry is recognized as a difficult task. When highly secure networks with back-to-back stateful firewalls interconnect, routing symmetry becomes a critical issue. Stateful firewalls require bi-directional protocols such as TCP to return responses such as acknowledgements through the same set of firewalls that the initial forward flow traverses. If a different firewall is used for the return flow, the TCP session will fail due to this firewall blocking the response packet since it does not have state information of the connection initiation.

Currently known methods of solving the problem of stateful firewalls and symmetric routing suffer from several main flaws. For example, if the networks are single-homed and are connected via one set of firewalls, the failure of a single firewall or of the link between the two firewalls will stop all inter-network traffic. Due to the single point of failure, this option cannot be used for high availability secure networks. If the networks are multi-homed but only one network uses firewalls and connection initiation is allowed from only one network, then routing symmetry is only needed in a single direction. Alternatively, networks can be multi-homed and connected via multiple firewalls but have only one set of firewalls used at any given time. In this situation, the other set of firewalls and the link between them are used as backup for a failure of the primary set. However, in this approach there is no load balancing of traffic. IGP metric manipulation may also be used to ensure that routing is symmetric. In this method, every router in each network should have a unique lowest cost path to one of the gateways. This method however, does not work when there is more than one lowest cost path from a router to a gateway. Traffic load balancing from a single router is not achievable due to this constraint. This method also does not work with certain network topologies, for example, where two gateways of one network are connected to a single gateway of another network.

With regard to the network address translation approach for symmetric routing, this approach is commonly used to solve problems associated with public IP address depletion and private address usage with Internet access. However, a side effect of network address translation guarantees symmetric routing in a single direction. The host can reach the Internet via network address translation gateways and return traffic would reach the same host via the same gateway. This is guaranteed by the fact that a unique inside global address block is associated with each network address translation gateway and the source IP address traffic from the host appearing in the Internet will have one or the other of these addresses as their source IP address. Therefore, the return traffic would flow through the appropriate gateway. By locating the stateful firewalls with the network address translation gateways the asymmetry problem is solved in situations where all connections are initiated from within the autonomous network.

However, this approach has several shortcomings. For connections initiated from the Internet or an outside network, symmetric routing is not guaranteed. For networks where firewalls are used back to back, symmetric routing in one direction is not sufficient. Further, for this method to be scalable, dynamic network address translation has to be used—but this causes the domain name service framework to become complex as domain name service (DNS) servers need to be assigned static addresses. Since applications and DNS servers cache DNS entries, the cache timeout periods need to be tuned with the network address translation timeout periods. Therefore, network address translation is not an ideal method for symmetric routing. Given the drawbacks of the present methods, it is therefore desirable to provide a method for efficient bi-directional routing which follows a symmetric path in multi-homed networks.

SUMMARY OF THE INVENTION

A method for receiving a packet from a host device, the packet including a source address and a destination address, determining whether the destination address is one of an actual destination device address and a first exterior routing address and substituting a symmetric response address for the source address in the packet when the destination address is the actual destination device address.

A method for receiving a packet from an external gateway, the packet including a source address and a destination address, determining whether the destination address is one of an actual destination device address and an exterior routing address and substituting the actual destination device address for the destination address when the destination address is the exterior routing address.

A translation gateway for a network that includes a receiving module to receive a packet from a host device, the packet including a source address and a destination address, an analyzer module to determine whether the destination address is one of an actual destination device address and a first exterior routing address and a substitution module to substitute a symmetric response address for the source address in the packet when the destination address is the actual destination device address.

A method for symmetric bi-directional routing including sending an IP packet having a source address and a destination address from a first host, changing the source address to an exterior routing address by a first network address translation gateway of the first host when the destination address is from an assigned host address block of another network, receiving the packet with the exterior routing address by a second gateway of a second host and sending the packet with the exterior routing address to the second host.

A system for symmetric bi-directional routing that includes first and second autonomous systems in communication with and connected by a transit network. The first autonomous system having a first host in communication with a first network address translation gateway and the first host having a source address and the first network address gateway capable of changing the source address to an exterior routing address for transit through the transit network to the second autonomous system. The second autonomous system receiving the exterior routing address by a first network address translation gateway of the second autonomous system and communicating the exterior routing address to a second host, whereby the second autonomous system responds to the first host of the first autonomous system along a symmetrical route by having the second autonomous system use the exterior routing address as a destination address to the first network address translation gateway of the first host.

A method for receiving a packet from a host device, the packet including a source address and a destination address, maintaining the source address in the packet when the destination address is a first exterior routing address and substituting a second exterior routing address for the source address in the packet when the destination address is the actual destination.

DETAILED DESCRIPTION

The present invention provides for bi-directional conditional network address translation with exterior routing which overcomes the shortcomings described above while preserving the beneficial features. The present invention extends network address translation by making it conditional and combining it with exterior routing to provide an efficient method of bidirectional symmetric routing. In the present invention, conditional network address translation is different than the conditional network translation in the prior art. In the prior art, conditional network address translation constitutes substituting the source address of a packet only when the original source address is from a particular block. In the present invention, conditional network address translation constitutes substituting the source address of a packet only when the destination address of the packet is from a particular address block. The method of the present invention relies on network addressable translation only for its symmetric response feature and neither for conserving IP addresses nor for using private IP addresses The term symmetric response address means an address that is substituted for the original source address of a packet to ensure that the response to the packet is received via the same gateway as the one used by the original packet on leaving the network. The return path of the response packet entering the network is guaranteed to be via the same gateway by the fact that each set of symmetric response addresses is only advertised by a single gateway and, therefore, any packet destined to a symmetric response address will necessarily enter the network via the gateway advertising the particular symmetric response address.

The present invention has the advantage of having the forward path and the return path of traffic go through the same set of stateful firewalls for a network connected via back-to back stateful firewalls. This prevents network traffic from being blocked by a firewall which is not aware of the connection maintained at another firewall. In the present invention, by routing symmetry what is meant is that a response packet traverses the same set of firewall gateways as the packet that initiated the response. It is clear that this symmetry is sufficient to guarantee connection maintenance in multi-homed networks using stateful firewalls.

The method of the present invention for symmetric bi-directional routing includes the steps of sending an IP packet having a source address from a first host and changing the source address to an exterior routing address by a first network address translation gateway of the first host. The packet with the exterior routing address is received by a first gateway of a second host which then sends the packet with the exterior routing source address to the second host. The method then has the second host respond to the first host along a symmetrical route, i.e., a route that traverses the same set of firewall gateways as the initial packet, by having the second host use the exterior routing address as a destination address to send a response packet to the first network address translation gateway of the first host. The response packet with the exterior routing address is then received by the first network address translation gateway of the first host where the exterior routing address is changed to the original source address of the first host which then receives the response packet. The method of the present invention includes the first gateway of the first host having a stateful firewall, and likewise, the first gateway of the second host may also include a stateful firewall. The method is useful where the first host and the second host are part of a multi-homed network.

Further, in the method of the present invention, it is preferable that the exterior routing address be a symmetric response address. In a preferred embodiment, the destination address is a symmetric response address. The method may also be used in a network where the first network address translation gateway of the first host is multi-homed to at least two network address translation gateways of a second host. The method of the present invention can be used in an architecture where the first network address translation gateway of the first host is multi-homed to multiple internet service providers. In another embodiment, the method further includes sending the IP packet with the exterior routing address from the second host to a third host and having the third host respond to the second host along a symmetrical route by having the third host use the exterior routing address as a destination address to send a response packet to a network address translation gateway of the second host. From there, the second host would respond to the first host as described above.

The present invention also includes a system for symmetric bi-directional routing which comprises first and second autonomous systems in communication with and connected by a transit network. The first autonomous system has a first host in communication with a first network address translation gateway. The first host has a source address and the first network address gateway is capable of changing the source address to an exterior routing address for transit through the transit network to the second autonomous system. The system of the present invention has the second autonomous system receiving the exterior routing address by a first network address translation gateway of the second autonomous system and then communicating the exterior routing address to a second host. The second autonomous system then responds to the first host of the first autonomous system along a symmetrical route by having the second autonomous system use the exterior routing address as a destination address to the first network address translation gateway of the first host.

Preferably, the system has a stateful firewall collocated with the first network address translation gateway for each of the first and second hosts. Preferably, the system has the first host and the second host as part of a multi-homed network and the exterior routing address includes a symmetric response address. The system may also be utilized in architectures where a network address translation gateway of the first autonomous system and host is multi-homed to at least two network address translation gateways of a second autonomous system and host. The system may also be used where the transit network includes multiple interne service providers.

In another embodiment, the system may also be used with a third autonomous system in communication with the second autonomous system. Here, the third autonomous system receives the exterior routing address by a first network address translation gateway of the third autonomous system and communicates the exterior routing address to a third host. The third autonomous system responds to the second host of the second autonomous system along a symmetrical route by having the third autonomous system use the exterior routing address as a destination address to a network address translation gateway of the second host.

The method and system of the present invention achieves bi-directional routing symmetry with no control plane manipulations. The symmetric response addresses are injected into the exterior routing protocols at the gateways. Minimal network address translation configurations are needed at each gateway and no configuration is needed at any of the interior routers or hosts. The present invention also does not introduce domain name server related complications. The present invention is scalable up to mid-size networks with a few thousand simultaneous connections across network address translation firewalls. Further, in the present invention, load balancing and failure recovery across an arbitrary number of network address translation firewall gateways is preserved based on the interior and exterior routing protocols used. The present invention also has the advantage of using only existing router capabilities.

Figure 1:
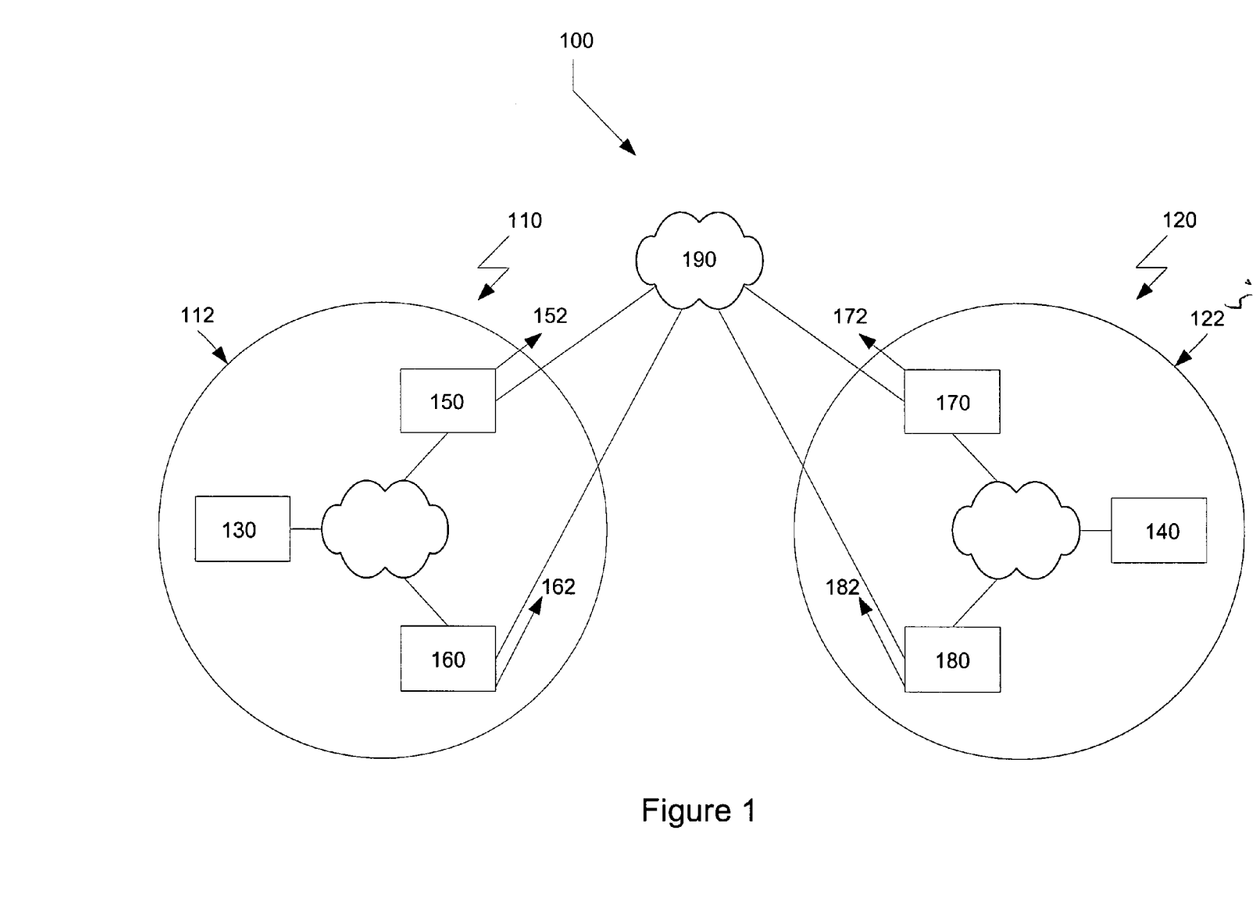
FIG. 1 is an exemplary schematic of the present invention.

In FIG. 1, an embodiment of the present invention is shown. The system 100 includes two networks 110 and 120. Network 110 includes host 130 and stateful firewalls located with network address translation gateways 150 and 160. The network 110 is defined by boundary 112. Likewise, network 120 includes host 140 and stateful firewalls located with network address translation gateways 170 and 180. The network 120 is defined by boundary 122. The networks 110 and 120 are connected through exterior transit network 190. Both networks 110 and 120 are autonomous systems which are using their respective firewalls 150, 160, 170, and 180 to allow connection initiation from either network. The firewalls 150, 160, 170, and 180 are also network address translation and exterior routing protocol gateways, such as BGP gateways. The advertisement of each exterior routing protocol gateway, indicated by arrows 152, 162, 172, and 182, provides two sets of exterior routing protocol routes (one common and one unique route per gateway) across the respective autonomous system boundary 112 or 122 of the autonomous system 110 or 120, as follows:

For example, first autonomous system 110 advertises the route 1.0.0.0/24 at both 150 and 160 by respective arrows 152 and 162. This pool of addresses is assigned to actual hosts in first autonomous system 110. Further, the first autonomous system 110 also advertises two other routes as 2.0.0.0/24 at 152 and 3.0.0.0/24 at 162, which are not assigned to any physical entity in autonomous system 110, but injected into the exterior routing protocol, such as BGP, to be advertised to second autonomous system 120. The conditional translation requirement for a packet leaving a given autonomous system is that the destination IP address of the IP packet be an assigned IP address in the other autonomous system. For every IP packet going from autonomous system 110 to autonomous system 120 for which the conditional translation requirement is met, the source address of the IP packet having a value from the 1.0.0.0/24 block is dynamically substituted with an address from either pool 2.0.0.0/24 by the network address translation firewall 150 or pool 3.0.0.0/24 by the network address translation firewall 160. The particular address pool selected for substitution of the source address is determined by the choice of the exit network address translation firewall gateway 150 or 160 from first autonomous system 110.

Similarly, autonomous system 120 advertises the route 101.0.0.0/24 at both 170 and 180 by respective arrows 172 and 182. This pool of addresses is assigned to hosts in autonomous system 120. The second autonomous system 120 advertises two other routes as 102.0.0.0/24 at 172 and 103.0.0.0/24 at 182 which are injected into the exterior routing protocol and advertised to first autonomous system 110. For any IP packet going from autonomous system 120 to autonomous system 110 and meeting the conditional translation requirement the source address of the IP packet having a value from the 101.0.0.0/24 block is dynamically substituted with an address from either pool 102.0.0.0/24 by the network address translation firewall 170 or pool 103.0.0.0/24 by the network address translation firewall 180. Once again, the particular address pool selected for substitution of the source address is determined by the choice of the exit network address translation firewall gateway 170 or 180 from autonomous system 120.

It should be noted that the respective addresses 1.0.0.0/24 and 101.0.0.0/24 assigned to physical entities of autonomous systems 110 and 120 are used in domain name server entries, thereby maintaining standard domain name server functionality. Since these never change, the domain name server problems associated with prior methods are not existent in the method of the present invention. In contrast, the addresses 2.0.0.0/24, 3.0.0.0/24 and 102.0.0.0/24 and 103.0.0.0/24 are symmetric response addresses which are used in network address translation pools and injected into the exterior routing protocol at the exit network address translation firewall gateways 150, 160, 170 or 180, respectively.

Bi-directional symmetric routing is accomplished by duplicating the single direction scheme with the combined exterior routing protocol and conditional network address translation. A connection initiated in one network, such as 110, uses the destination address for the IP packet an address which has not been translated by the network address translator. The connection will select a network address translation firewall gateway using the exterior and interior protocols in use. When the IP packet reaches the chosen network address translation firewall, that is, either 150 or 160 in FIG. 1, the packet's source IP address will be changed by network address translation to the corresponding symmetric response address for that gateway. Once the packet reaches its destination, any response to this packet uses the received packet's source IP address as the new destination IP address. This ensures that the response packet chooses the same set of network address translation firewall gateways as that traversed by the initial packet since only one gateway is advertising each symmetric response address block. When this response packet reaches the first network address translation firewall gateway in network 120, translation does not occur since the conditional translation requirement is not met. This is the conditional action of network address translation—that is network address translations occur for packets leaving a network address translation gateway only when the destination address is an actual assigned address, such as 1.0.0.0/24 and 101.0.0.0/24 described above. Address translation is not performed when a packet leaving a network address translation gateway has a destination address from the blocks used for the symmetric response, such as 2.0.0.0/24, 3.0.0.0/24, 102.0.0.0/24, or 103.0.0.0/24.

Figure 1A:
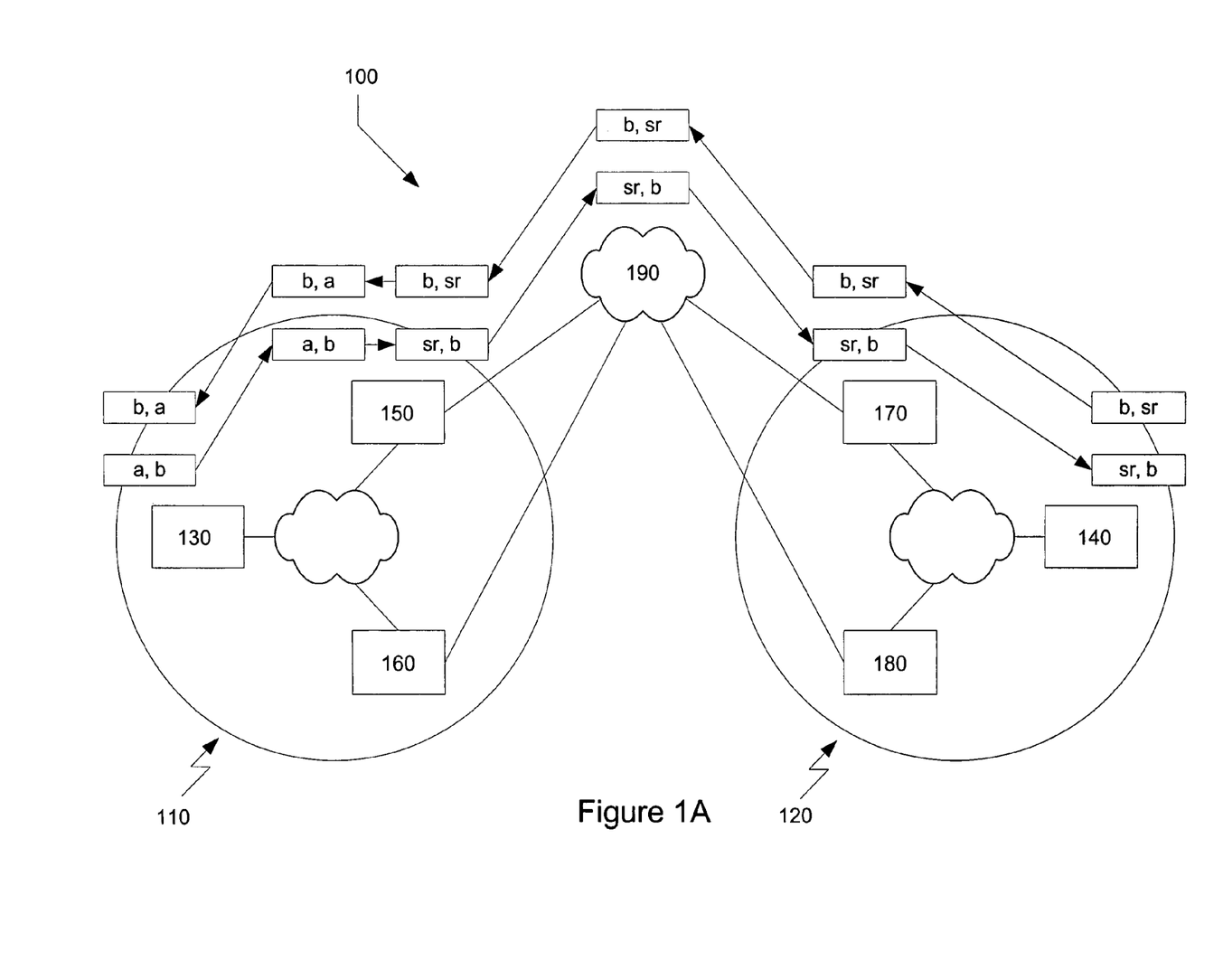
FIG. 1A illustrates an exemplary operation of the present invention.

Referring now to FIG. 1A, the operation of the present invention 100 is described to show how the source IP and destination IP addresses (represented respectively as 'a' and 'b') change for an IP packet going from a first autonomous system 110 to a second system 120 and also for the response packet. Host 130 with source address route 1.0.0.1 ('a') is sending a packet to second host 140 with destination address route 101.0.0.1 ('b') and the upper network address translation firewall 150 is chosen as the exit point from autonomous system 110 based on interior and exterior routing criteria. In FIG. 1A, the source address ('a') and destination IP address ('b') of the initial packet and the associated response packet change when crossing to and from the network address translation firewalls 150, 160, 170, and 180. For this bi-direction connection only one gateway, 150, performs network address translations, changing the initial source address ('a') to an external routing symmetric response address (represented by 'sr' in FIG. 1A). Therefore, external to autonomous system 110, the packet's source and destination addresses are identified as 'sr,b' as indicated at transit network 190. When the packet reaches autonomous system 120, network address translation firewall 170 identifies the packet as 'sr, b' and communicates this to host 140. When host 140 sends its response to host 130, the packet is identified as 'b, sr' at network address translation firewall 170. However, translation firewall 170 does not perform a translation on the outgoing packet and the packet is forwarded to the external transit network 190 as 'b,sr.' This function is the "conditional" network address translation. For example, without the conditional behavior of network address translation, TCP would not function. As shown in FIG. 1A, host 130 is expecting a connection between source route 1.0.0.1 ('a') and destination route 101.0.0.1 ('b'). However, if network address translation firewall 170 performed a translation on the outgoing response packet from host 140, the received response packet at first host 130 would have a source address of 102.0.0.x. This response would be rejected since first host 130 expects a response from destination address 101.0.0.1 ('b'). Due to conditional network address translation of the present invention, first host 130 sees a connection between source route 1.0.0.1 ('a') and route 101.0.0.1 ('b') while second host 140 sees the same connection to be between 101.0.0.1 ('b') and an external routing address, such as 2.0.0.3 ('sr'). Network address translation firewall 150 translates from the source address such as 1.0.0.1 ('a') to the external routing symmetric response address ('sr') such as 2.0.0.3 and back. Therefore, when the network address translation firewall 150 receives the response packet 'b, sr' from transit network 190, firewall 150 performs a translation on the packet so the addresses change from 'b, sr' to 'b, a.' This is then sent to host 130. Those skilled in the art would recognize a similar scenario to that just described exists where second host 140 initiates the connection to first host 130 and network address translation firewall 170 would perform address translation.

Figure 5:
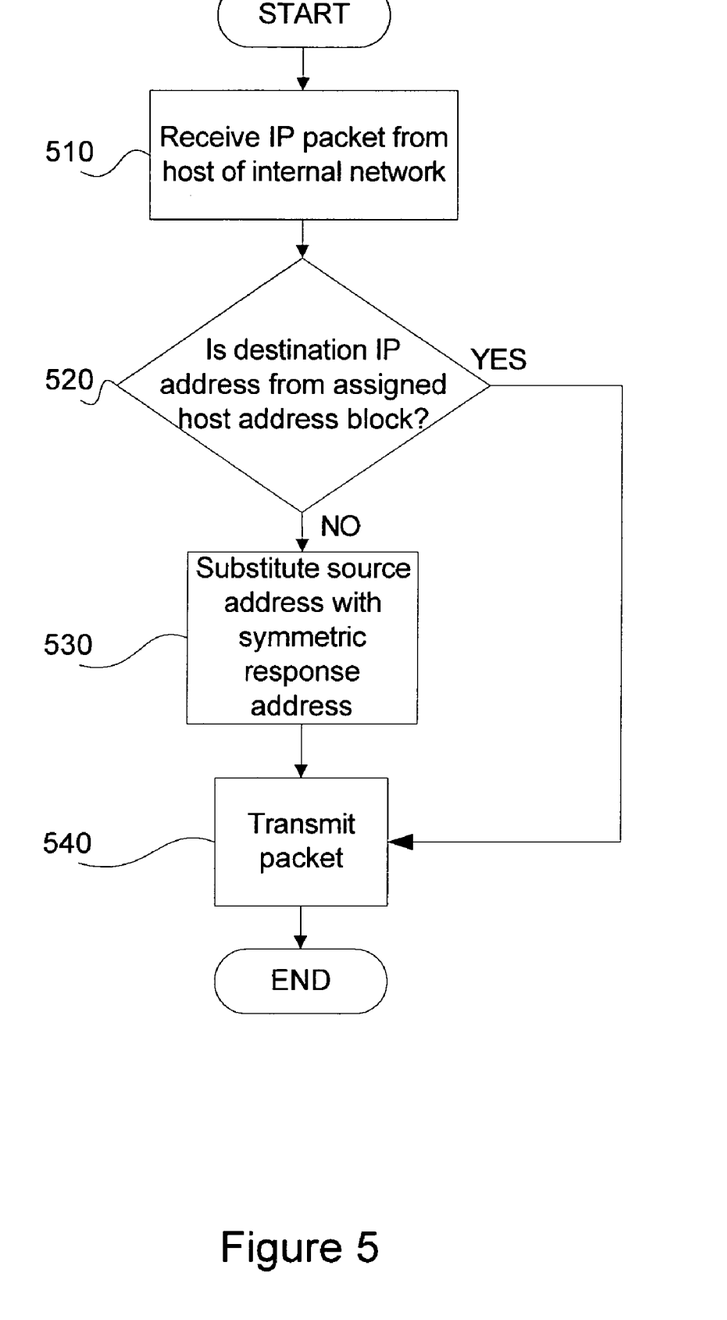
FIG. 5 is an exemplary method for processing packets received from hosts of an internal network at a NAT gateway according to the present invention.

FIG. 5 shows an exemplary method 500 for processing packets received from hosts of an internal network at a network address translation ("NAT") gateway. The method 500 will be described with respect to the example provided above in FIG. 1A. Thus, in step 510, a network address translation gateway receives a packet from a host of an internal network, e.g., host 130 sends a packet to network address translation gateway 150 or host 140 sends a packet to network address translation gateway 170. In step 520, the network address translation gateway determines whether the destination address is an actual assigned address or an external network address, i.e., is the destination address from an assigned host address block.

If the destination address is from an assigned host address block, the network address translation gateway substitutes the source address with a symmetric response address from the pool of addresses maintained by the network address translation gateway (step 530). The network address translation gateway then transmits the packet with the substituted source address (step 540). This is shown in the above example, when the source address of the host 130 is replaced with the external network address by the network address translation gateway 150 because the destination address is the actual assigned address of the host 140.

If the destination address is determined to be an external network address in step 520, the network address translation gateway does not perform any substitution for the source address, but transmits the packet in step 540 with the source address intact. This is shown in the above example, when the source address of the host 140 is not replaced with the external network address by the network address translation gateway 170 because the destination address is the external network address assigned to the host 140 by the network address translation gateway 150. Thus, the method 500 shows the conditional nature of the network address translation gateways for packets received from host devices.

Figure 6:
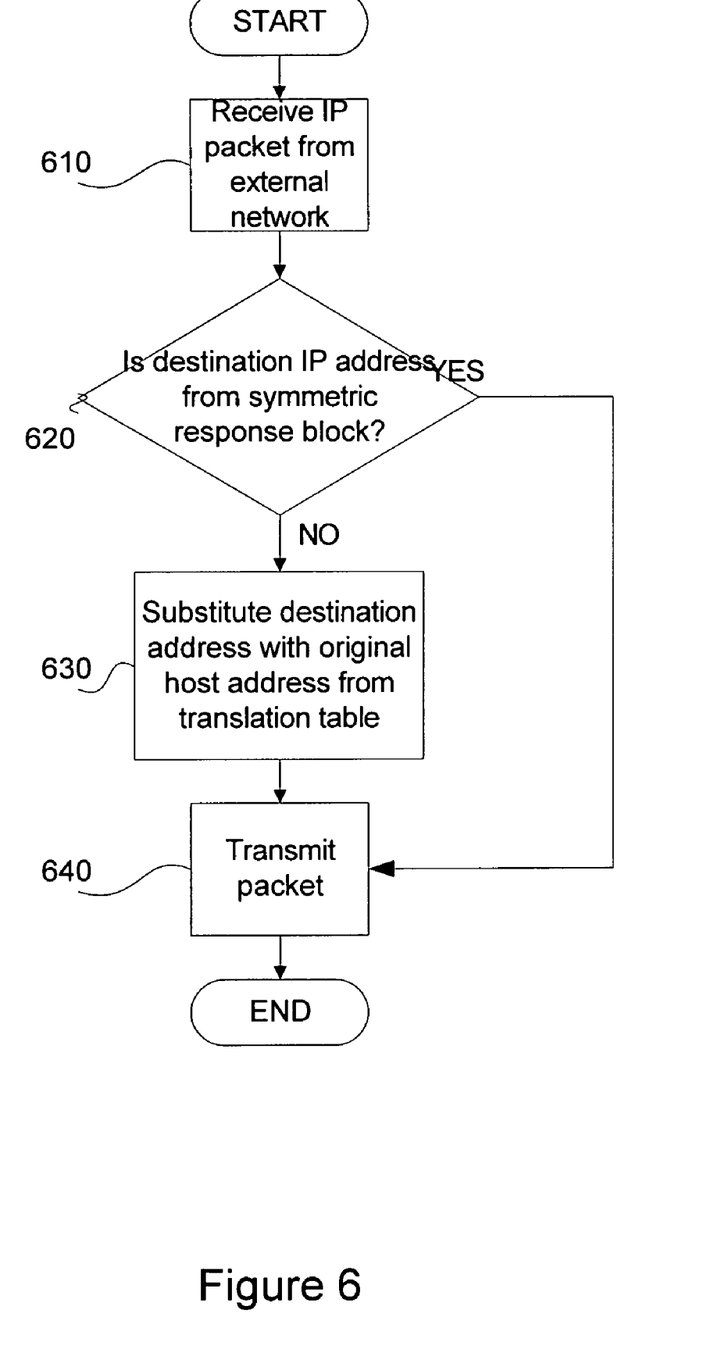
FIG. 6 is an exemplary method for processing packets received from an external network at a NAT gateway according to the present invention.

FIG. 6 shows an exemplary method 600 for a network address translation gateway to process a packet received from another network address translation gateway. As with the method 500, the method 600 will be described with respect to the example provided above in FIG. 1A. Thus, in step 610, a network address translation gateway receives a packet from an external network, e.g., network address translation gateway 150 sends a packet to network address translation gateway 170 or vice versa. Those of skill in the art will understand that there may be one or more intervening networks (e.g., transport network 190) between the gateways. In step 620, the receiving network address translation gateway determines whether the destination address is an actual assigned address or an external network address, i.e., is the destination address from a symmetric response block.

If the destination address is not from a symmetric response block, the receiving network address translation gateway proceeds directly to step 640 and transmits the packet to the destination device. This is shown in the above example, when the network address translation gateway 170 receives the packet with the destination address of the host 140 from the network address translation gateway 150 and transmits the packet to the host 140 without any substitution of source or destination addresses.

If the destination address is determined to be from a symmetric response block in step 620, the network address translation gateway substitutes the actual assigned address for the external address in the destination address (step 630) and then transmits the packet in step 640 to the host. As described above, this situation will occur when the packet is a response packet and thus, the network address translation gateway will maintain a record of the correlation between the external network address and the actual assigned address for the destination host for the purposes of substituting the actual assigned address. This is shown in the above example, when the network address translation gateway 150 receives the response packet having the destination address of the external network address correlating to the host 130. The network address translation gateway 150 replaces the external network address in the destination address with the actual assigned address of the host 130 and then transmits the packet to the host 130. Thus, the method 600 shows the conditional nature of the network address translation gateways for packets received from other network address translation gateways.

Figure 2:
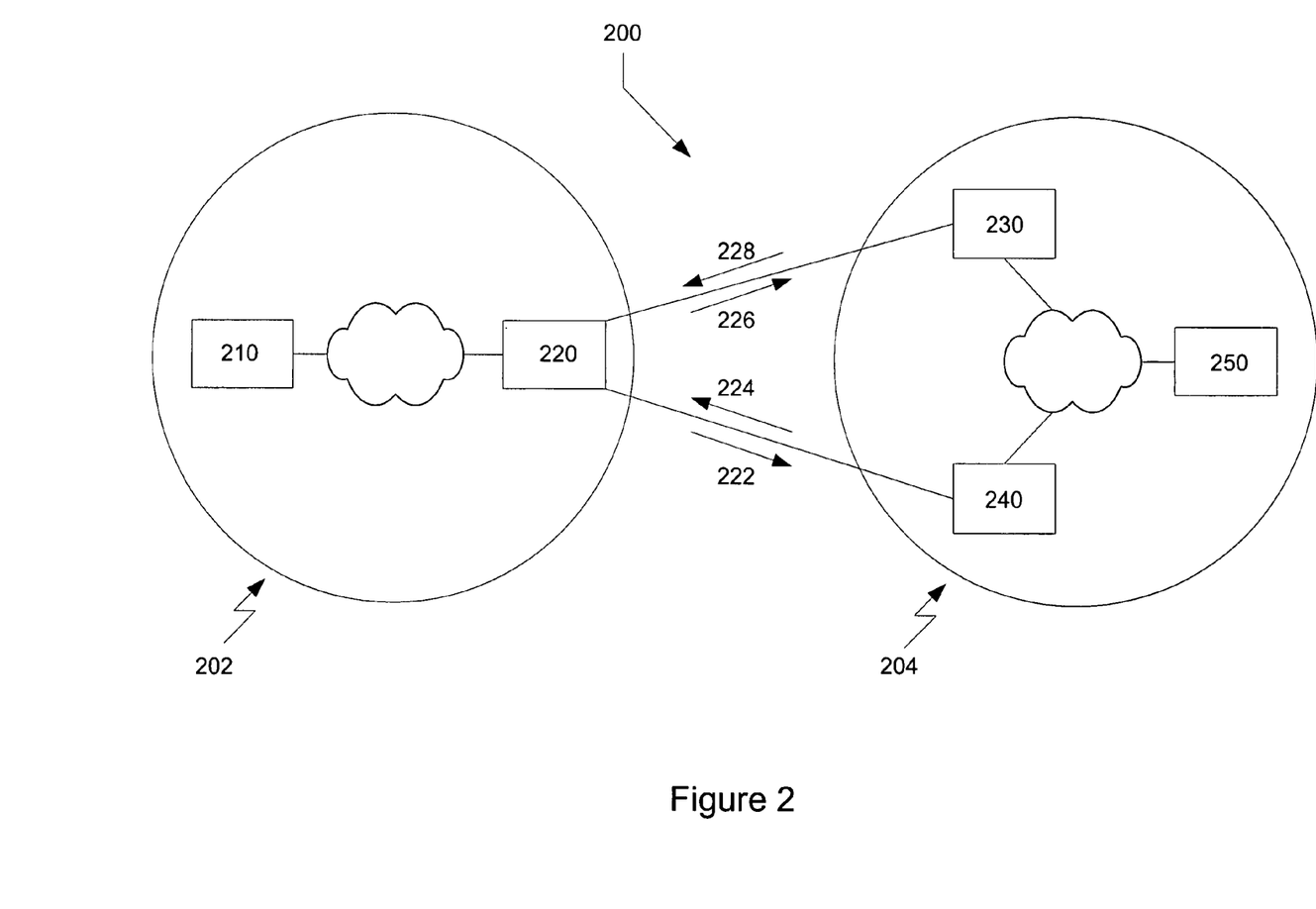
FIG. 2 is an exemplary schematic of the present invention in use with an alternative multi-homed network architecture.

In FIG. 2, there is provided an additional example of where the symmetric routing of the present invention can be used in a multi-homing network architecture with stateful firewalls. In this Figure, there is a single network address translation firewall gateway 220 multi-homed to two network address translation firewall gateways 230 and 240. Arrows 222, 224, 226, and 228 show route advertisements. The figure shows a modified multi-homing architecture between two networks 202 and 204 where a single gateway 220 is connected to two gateways 230 and 240 in the second network 204. In this configuration, the network address translation at 220 uses as an additional condition the outgoing interface of a packet in order to select the dynamic network address translation pool for the source address substitution. In present systems, this may be achieved by using a route map in the network address translation configuration.

Figure 3:
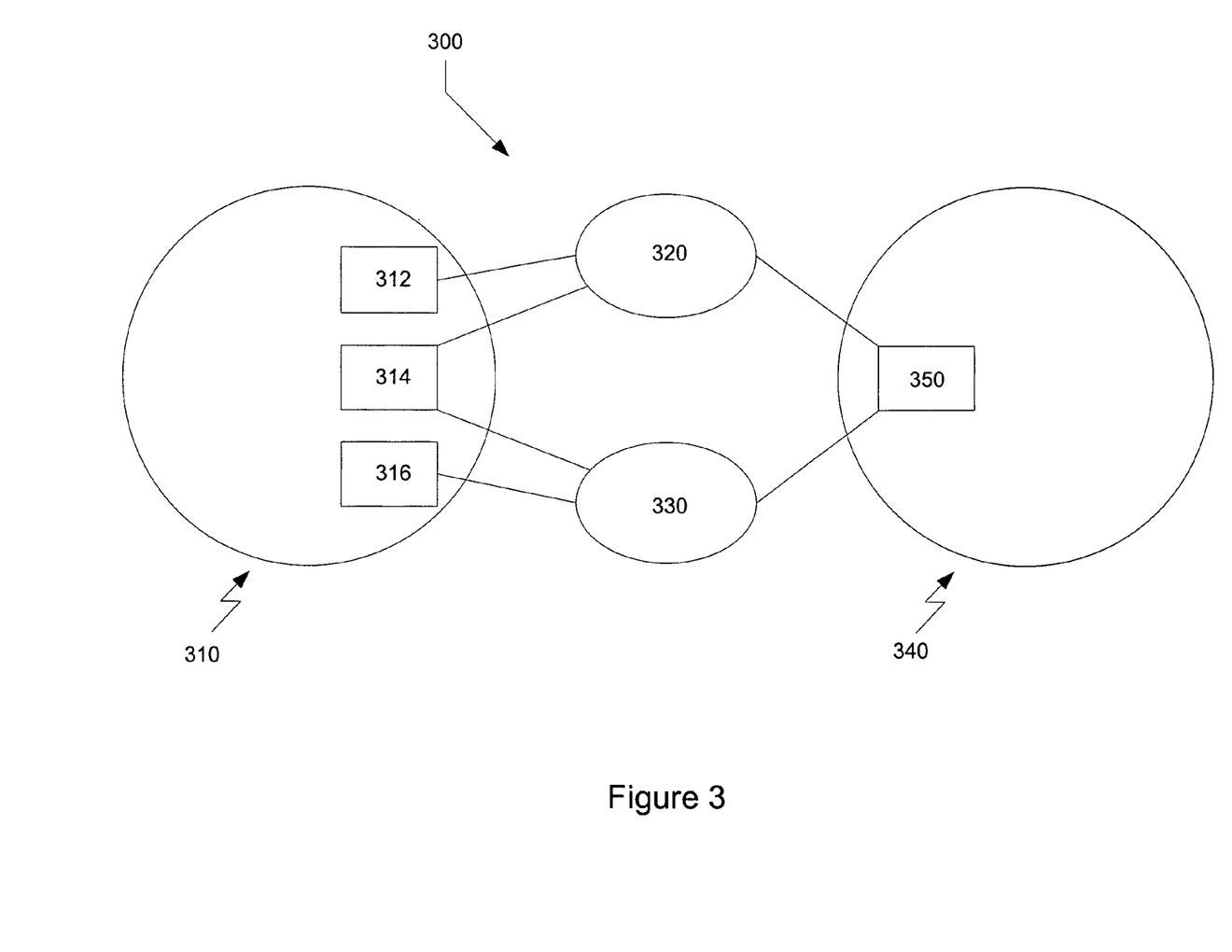
FIG. 3 is an exemplary schematic of the present invention in use with a network multi-homed to multiple interne service providers.

Referring to FIG. 3, there is shown a network 300 with autonomous systems 310 and 340 multi-homed to multiple internet service providers 320 and 330. In this configuration, the same symmetric response address pool can be advertised to both internet service providers 320 and 330 from gateways 314 and 350 that are multi-homed to both internet service providers 320 and 330. For example, network address translation firewall 314 can advertise the same symmetric response address to the first internet service provider 320 and the second internet service provider 330 since the return traffic will enter network address translation firewall 314 even when the return path is through a second internet service provider, such as 330. This embodiment is also applicable when the first autonomous system 310 uses layer 3 VPN services from both internet service providers 320 and 330.

Figure 4:
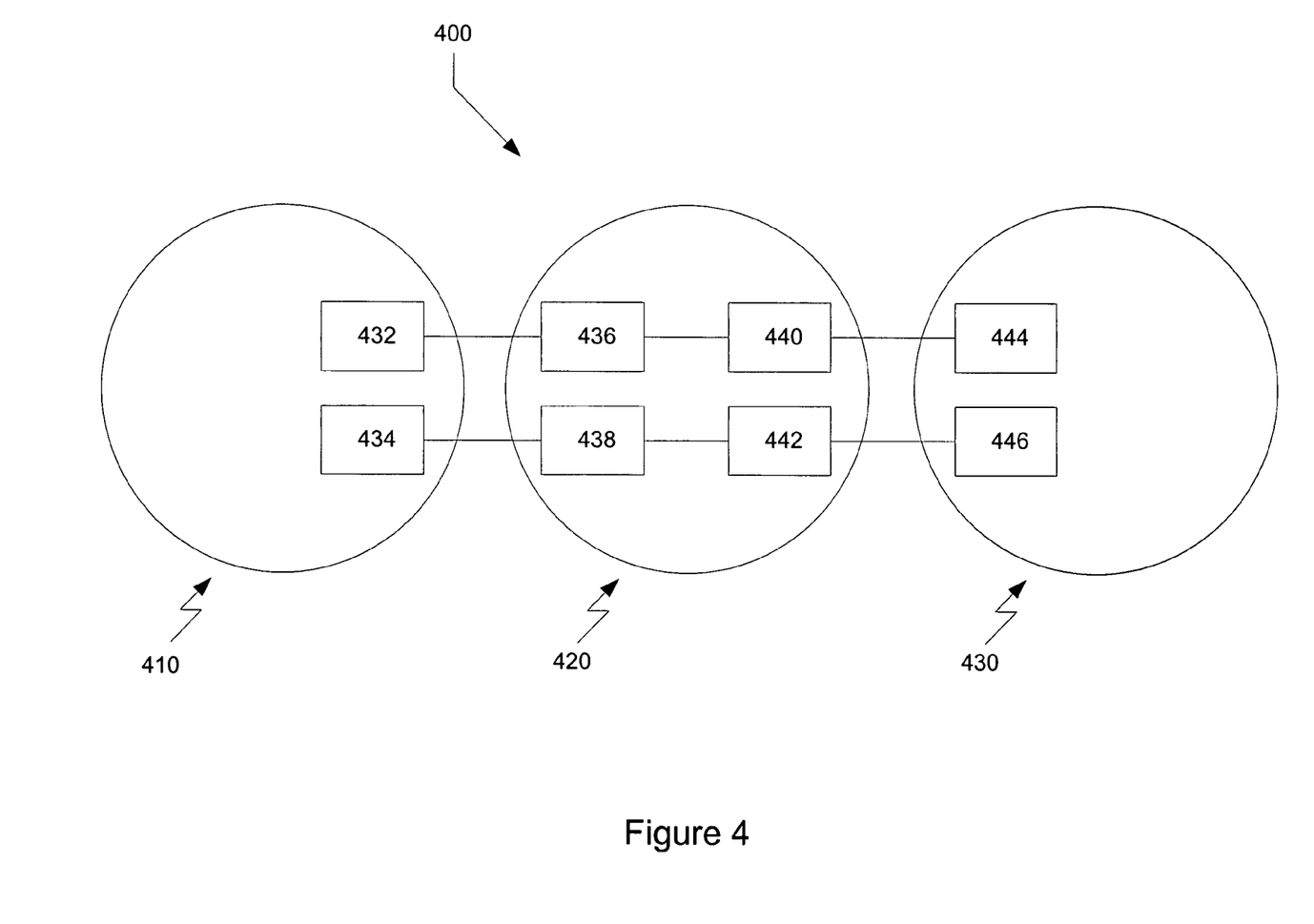
FIG. 4 is an exemplary schematic of the present invention in use with three entities multi-homed across stateful firewalls.

Referring to FIG. 4, there is shown an architecture where three networks 410, 420, and 430 are multi-homed via stateful firewalls (432, 434, 436, 438, 440, 442, 444, and 446). This architecture may be found in a single enterprise network where a high level of security and compartmentalization is needed. Network address translation firewall gateways 436 and 440 can use the same dynamic network address translation pools and advertise the same symmetric response routes to their respective directly connected networks 410 and 430. Gateways 438 and 442 act in similar manner.

Those skilled in the art would appreciate that the present invention is independent of specific features of the exterior routing protocol. Thus, this method is valid for other exterior routing protocols other than BGP, as well as interior routing protocols such as OSPF and IS-IS used between two networks. Furthermore, the method and system are valid when the firewall, the network address translation and BGP functions are all on a single router or when these three functions are placed on separate physical entities that are collocated.

What is claimed is:

1. A method, comprising:
   receiving a packet from a host device, the packet including a source address and a destination address;
   determining whether the destination address is an actual destination device address or a first exterior routing address; and
   substituting a symmetric response address for the source address in the packet, based on a determination that the destination address is the actual destination device address,
   wherein the symmetric response address is not substituted for the source address if it is determined that the destination address is the first exterior routing address,
   wherein the symmetric response address ensures that a response to the packet is received by the host device via an external gateway used by the packet on leaving a network of the host device.

2. The method of claim 1, further comprising:
   transmitting the packet to the external gateway with the substituted symmetric response address.

3. The method of claim 1, further comprising:
   transmitting the packet to the external gateway without substituting the symmetric response address when the destination address is an exterior routing address of an external network.

4. The method of claim 1, wherein the symmetric response address is selected from a predetermined pool of exterior routing addresses.

5. The method of claim 1, wherein the packet is an IP packet.

6. A system for symmetric bi-directional routing comprising:
   first and second autonomous systems in communication with and connected by a transit network;
   the first autonomous system having a first host in communication with a first network address translation gateway;
   the first host having a source address and the first network address gateway capable of changing the source address to an exterior routing address for transit through the transit network to the second autonomous system, the first host changing the source address to the exterior routing address if a destination address is from an assigned host address block of another network;
   the second autonomous system receiving the exterior routing address by a first network address translation gateway of the second autonomous system and communicating the exterior routing address to a second host;
   whereby the second autonomous system responds to the first host of the first autonomous system along a symmetrical route by having the second autonomous system use the exterior routing address as a further destination address to the first network address translation gateway of the first host.

7. The system of claim 6, wherein the first network address translation gateway of the first host and the first network address translation gateway of the second autonomous system include a stateful firewall.

8. The system of claim 6, wherein the exterior routing address includes a symmetric response address.

9. The system of claim 6, wherein the first network address translation gateway of the first autonomous system is multi-homed to at least two network address translation gateways of the second autonomous system.

10. The system of claim 8, wherein the transit network includes multiple Internet service providers.

11. The system of claim 8, further comprising a third autonomous system in communication with the second autonomous system,
   the third autonomous system receiving the exterior routing address by a first network address translation gateway of the third autonomous system and communicating the exterior routing address to a third host;
   whereby the third autonomous system responds to the second host of the second autonomous system along a symmetrical route by having the third autonomous system use the exterior routing address as a destination address to the first network address translation gateway of the second host.

* * * * *